United States Patent
Kelley et al.

[11] Patent Number: 5,839,395
[45] Date of Patent: Nov. 24, 1998

[54] HORSE BLANKET

[76] Inventors: Nancy D. Kelley; Malcolm E. Kelley, both of 3665 E. Enon Rd., Yellow Springs, Ohio 45387-1111

[21] Appl. No.: 889,627

[22] Filed: Jul. 8, 1997

[51] Int. Cl.⁶ .............................. A01K 13/00; B68C 5/00
[52] U.S. Cl. ............................................. 119/850; 54/79.2
[58] Field of Search .............................. 119/850; 54/79.1, 54/79.2, 79.4

[56] References Cited

U.S. PATENT DOCUMENTS

| | | | |
|---|---|---|---|
| 448,376 | 3/1891 | Sisson | 54/79.2 |
| 484,996 | 10/1892 | Chamberlain | 54/79.1 |
| 658,894 | 10/1900 | Gordon | 54/79.2 |
| 660,414 | 10/1900 | Carli | 54/79.2 |
| 919,038 | 4/1909 | Lee | 54/79.2 |
| 1,028,138 | 6/1912 | Schleicher | 54/79.2 |
| 5,125,220 | 6/1992 | Martin | 54/79 |
| 5,161,352 | 11/1992 | Schneider et al. | 54/79.2 |

OTHER PUBLICATIONS

Brochure, The Rambo Wug® The Shape of Things To Come.
Advertisement, Storm King® Cordura® Full Hood.
Advertisement, SS Schneiders.
Advertisement, Turnout Sheets, Fly Sheets.

*Primary Examiner*—Michael J. Carone
*Assistant Examiner*—Elizabeth Shaw
*Attorney, Agent, or Firm*—Killworth, Gottman, Hagan & Schaeff, L.L.P.

[57] ABSTRACT

A horse blanket is provided defining a dressed configuration. The dressed configuration comprises a body of blanket material and a closure fastening assembly. The body of blanket material defines a major blanket portion, a wither/shoulder portion, and a front closure portion. The front closure portion comprises first and second closure flaps, wherein the first closure flap overlaps the second closure flap and wherein the first closure flap, the second closure flap, and the wither/shoulder portion define a neck opening. The closure fastening assembly is coupled to the body of blanket material and comprises: a first releasable wither/shoulder attachment coupled to the wither/shoulder portion and the first closure flap; and a second releasable wither/shoulder attachment coupled to the wither/shoulder portion and the second closure flap, wherein at least one of the first releasable wither/shoulder attachment, the second releasable wither/shoulder attachment, the wither/shoulder portion, the first closure flap, and the second closure flap, is provided with an elastic portion oriented about a portion of a periphery of the neck opening.

18 Claims, 4 Drawing Sheets

HORSE BLANKET

BACKGROUND OF THE INVENTION

The present invention relates to horse blankets and, more particularly, to a horse blanket incorporating overlapping front closure flaps and an elastic portion oriented about a neck opening defined by the horse blanket.

Conventional horse blankets are provided to protect a horse from mud, dirt, and moisture, and to provide a degree of thermal insulation. These conventional horse blankets typically conform to the shape of a horse's upper body to provide adequate protection from the elements and reduce discomfort. However, an unfortunate result of this fitted design is that movement of the horse's head and neck causes the horse blanket to bind about the horse's neck when the horse lowers his head. Additionally, repeated lowering and raising of the head typically results in substantial misalignment of the horse blanket about the horse.

Accordingly, a need exists for a horse blanket that alleviates blanket misalignment and blanket binding about the neck as a result of raising and lowering of the horse's head.

BRIEF SUMMARY OF THE INVENTION

This need is met by the present invention wherein a horse blanket is provided comprising overlapping front closure flaps and an elastic portion oriented about a portion of a periphery of a neck opening defined by the horse blanket.

In accordance with one embodiment of the present invention, a horse blanket is provided comprising a body of blanket material and a closure fastening assembly. The body of blanket material defines a major blanket portion, a wither/shoulder portion, and a front closure portion. The front closure portion comprises first and second closure flaps. The closure fastening assembly is coupled to the body of blanket material and comprises: a first releasable wither/shoulder attachment coupled to the wither/shoulder portion and the first closure flap; a second releasable wither/shoulder attachment coupled to the wither/shoulder portion and the second closure flap; and a wither/shoulder attachment passage extending from an interior side of the body of blanket material to an exterior side of the body of blanket material. The passage is positioned to pass a portion of the second releasable wither/shoulder attachment there through. The wither/shoulder attachment passage may be provided in the wither/shoulder portion proximate the first closure flap.

At least one of the first releasable wither/shoulder attachment, the second releasable wither/shoulder attachment, the wither/shoulder portion, the first closure flap, and the second closure flap, is preferably provided with an elastic portion oriented about a portion of a periphery of a neck opening defined by the body of blanket material. The elastic portion is preferably designed to provide about 14" (35 cm) of neck opening expansion. The elastic portion may comprise the elastic strap or stretch fabric.

For example, the first releasable wither/shoulder attachment and the second releasable wither/shoulder attachment may be provided with the elastic portion. Alternatively, the wither/shoulder portion may be provided with the elastic portion. As a further example, the first closure flap and the second closure flap may be provided with an elastic portion.

In accordance with yet another embodiment of the present invention, a horse blanket is provided comprising a body of blanket material, first and second releasable wither/shoulder attachments, and a wither/shoulder attachment passage. The body of blanket material defines a major blanket portion, a wither/shoulder portion, and a front closure portion. The front closure portion comprises first and second closure flaps. The first releasable wither/shoulder attachment is coupled to the wither/shoulder portion and the first closure flap. The first releasable wither/shoulder attachment comprises: a first elastic strap having a first end coupled to the first closure flap and a second end opposite the first end of the first elastic strap; a first wither/shoulder securement having a first end coupled to the wither/shoulder portion and a second end opposite the first end of the first securement; and a first releasable clip coupled to the second end of the first elastic strap and the second end of the first securement, wherein the first releasable clip is operative to couple releasably the first elastic strap and the first securement. The second releasable wither/shoulder attachment is coupled to the wither/shoulder portion and the second closure flap and comprises: a second elastic strap having a first end coupled to the second closure flap and a second end opposite the first end of the second elastic strap; a second wither/shoulder securement having a first end coupled to the wither/shoulder portion and a second end opposite the first end of the second securement; and a second releasable clip coupled to the second end of the second elastic strap and the second end of the second securement, wherein the second releasable clip is operative to couple releasably the second elastic strap and the second securement. The wither/shoulder attachment passage extends from an interior side of the body of blanket material to an exterior side of the body of blanket material and is positioned to pass a portion of the second releasable wither/shoulder attachment there through.

In accordance with yet another embodiment of the present invention, a horse blanket is provided defining a dressed configuration. The dressed configuration comprises a body of blanket material and a closure fastening assembly. The body of blanket material defines a major blanket portion, a wither/shoulder portion, and a front closure portion. The front closure portion comprises first and second closure flaps, wherein the first closure flap overlaps the second closure flap and wherein the first closure flap, the second closure flap, and the wither/shoulder portion define a neck opening. The closure fastening assembly is coupled to the body of blanket material and comprises: a first releasable wither/shoulder attachment coupled to the wither/shoulder portion and the first closure flap; a second releasable wither/shoulder attachment coupled to the wither/shoulder portion and the second closure flap; and a wither/shoulder attachment passage extending from an interior side of the body of blanket material to an exterior side of the body of blanket material, wherein a portion of the second releasable wither/shoulder attachment passes through the passage.

At least one of the first releasable wither/shoulder attachment, the second releasable wither/shoulder attachment, the wither/shoulder portion, the first closure flap, and the second closure flap, is preferably provided with an elastic portion oriented about a portion of a periphery of the neck opening. The elastic portion is operative to permit the area of the neck opening to expand.

In accordance with yet another embodiment of the present invention, a horse blanket is provided defining a dressed configuration. The dressed configuration comprises a body of blanket material and a closure fastening assembly. The body of blanket material defines a major blanket portion, a wither/shoulder portion, and a front closure portion. The front closure portion comprises first and second closure flaps, wherein the first closure flap overlaps the second closure flap and wherein the first closure flap, the second closure flap, and the wither/shoulder portion define a neck opening. The closure fastening assembly is coupled to the body of blanket material and comprises: a first releasable wither/shoulder attachment coupled to the wither/shoulder portion and the first closure flap; and a second releasable wither/shoulder attachment coupled to the wither/shoulder portion and the second closure flap, wherein at least one of the first releasable wither/shoulder attachment, the second releasable wither/shoulder attachment, the wither/shoulder portion, the first closure flap, and the second closure flap, is provided with an elastic portion oriented about a portion of a periphery of the neck opening.

Accordingly, it is an object of the present invention to provide an improved horse blanket for alleviating blanket binding about the neck of a horse and for substantially eliminating blanket misalignment resulting from raising and lowering of the horse's head.

DETAILED DESCRIPTION OF THE INVENTION

Figure 1:
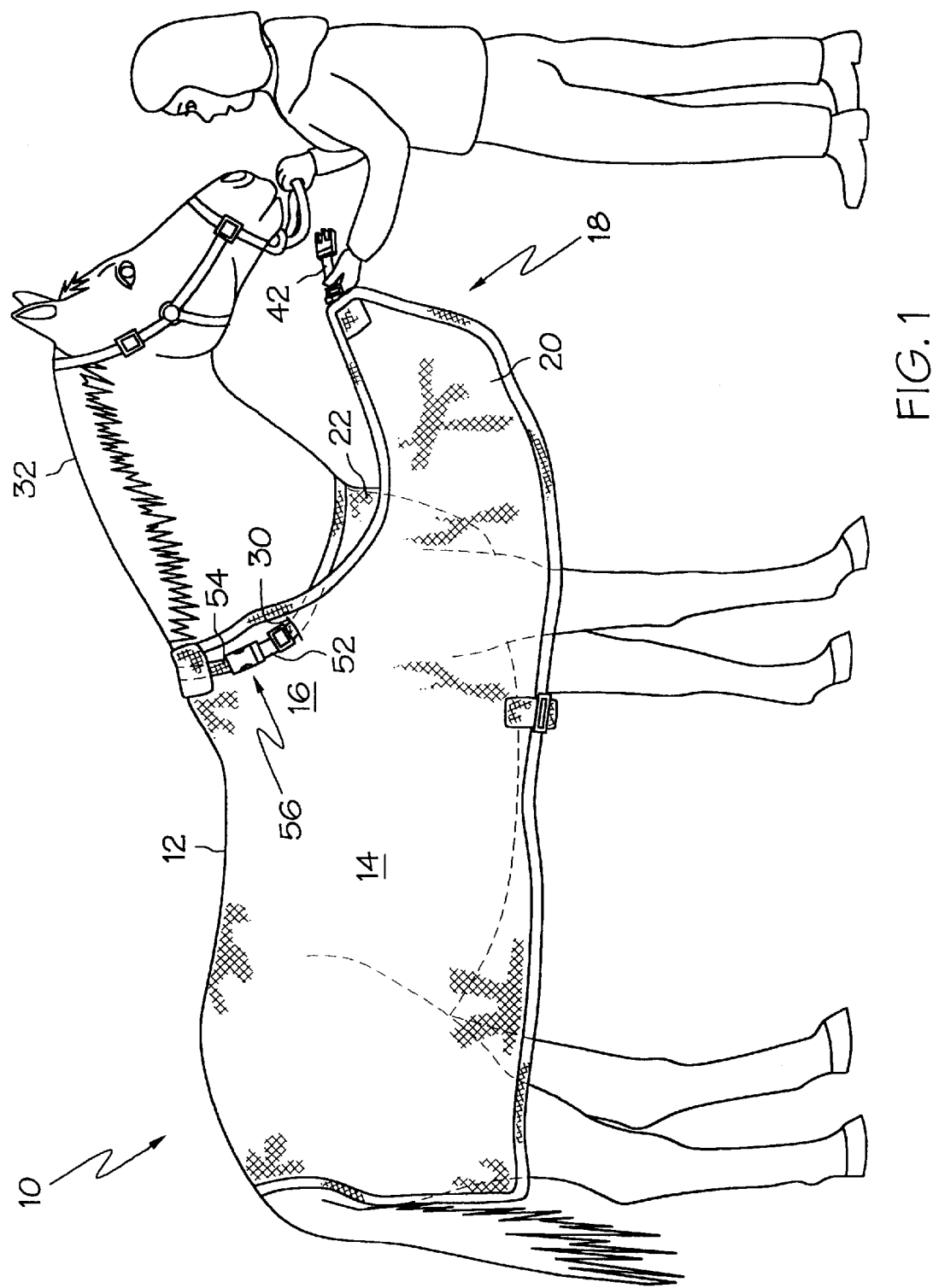
FIG. 1 is a right side plan view of a horse blanket according to the present invention.
Figure 2:
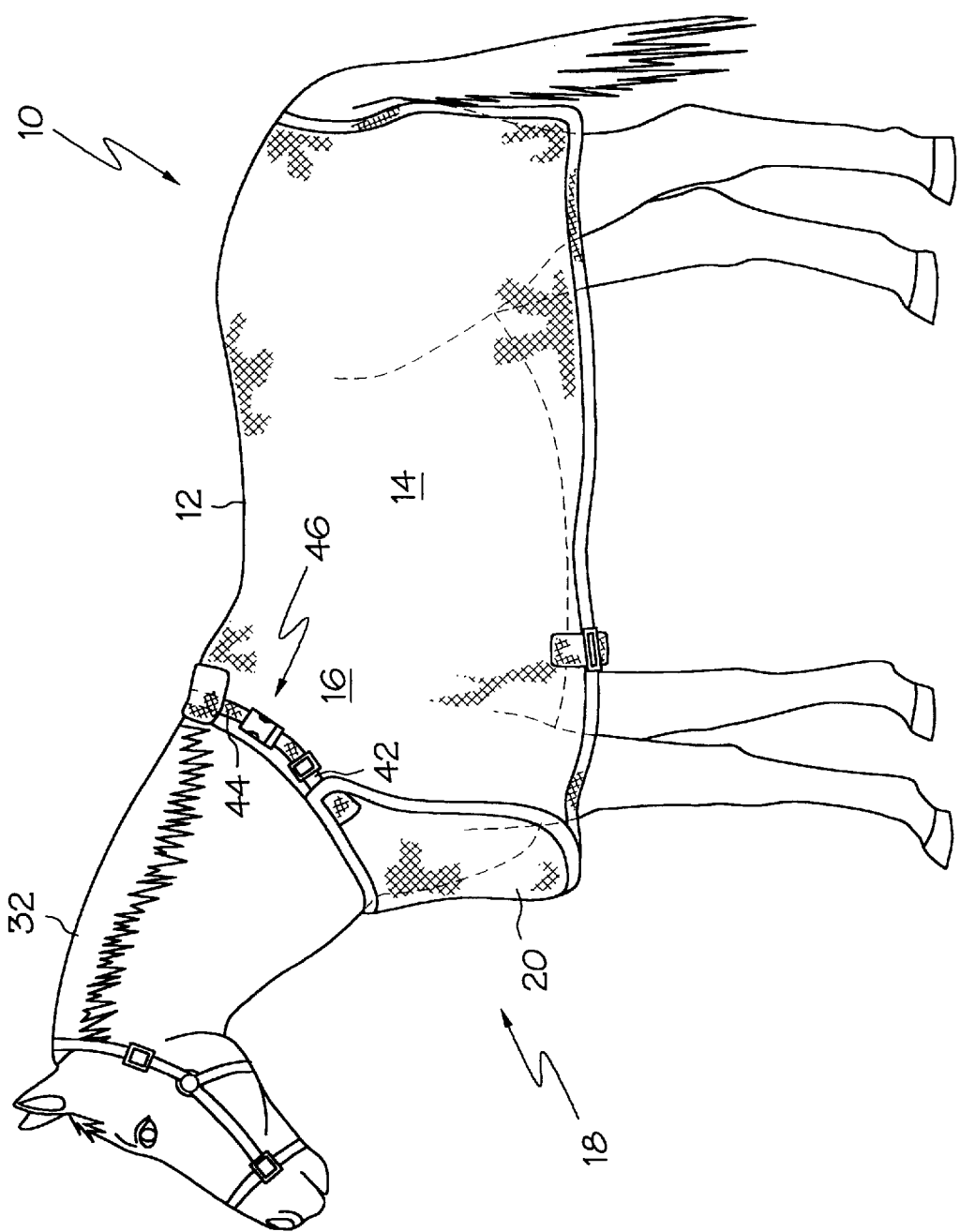
FIG. 2 is a left side plan view of a horse blanket according to the present invention.
Figure 3:
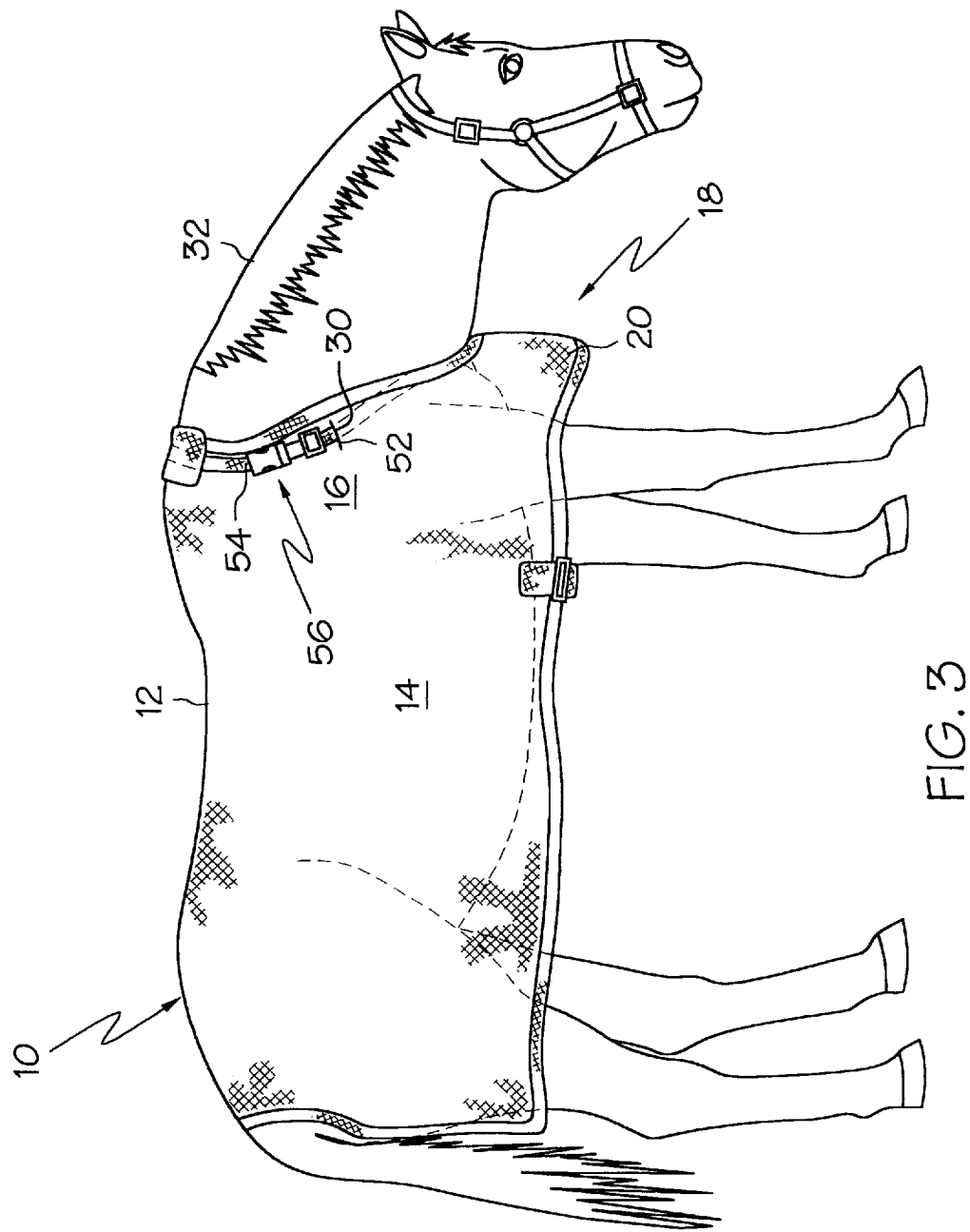
FIG. 3 is a right side plan view of a horse blanket according to the present invention in a head-down position.
Figure 4:
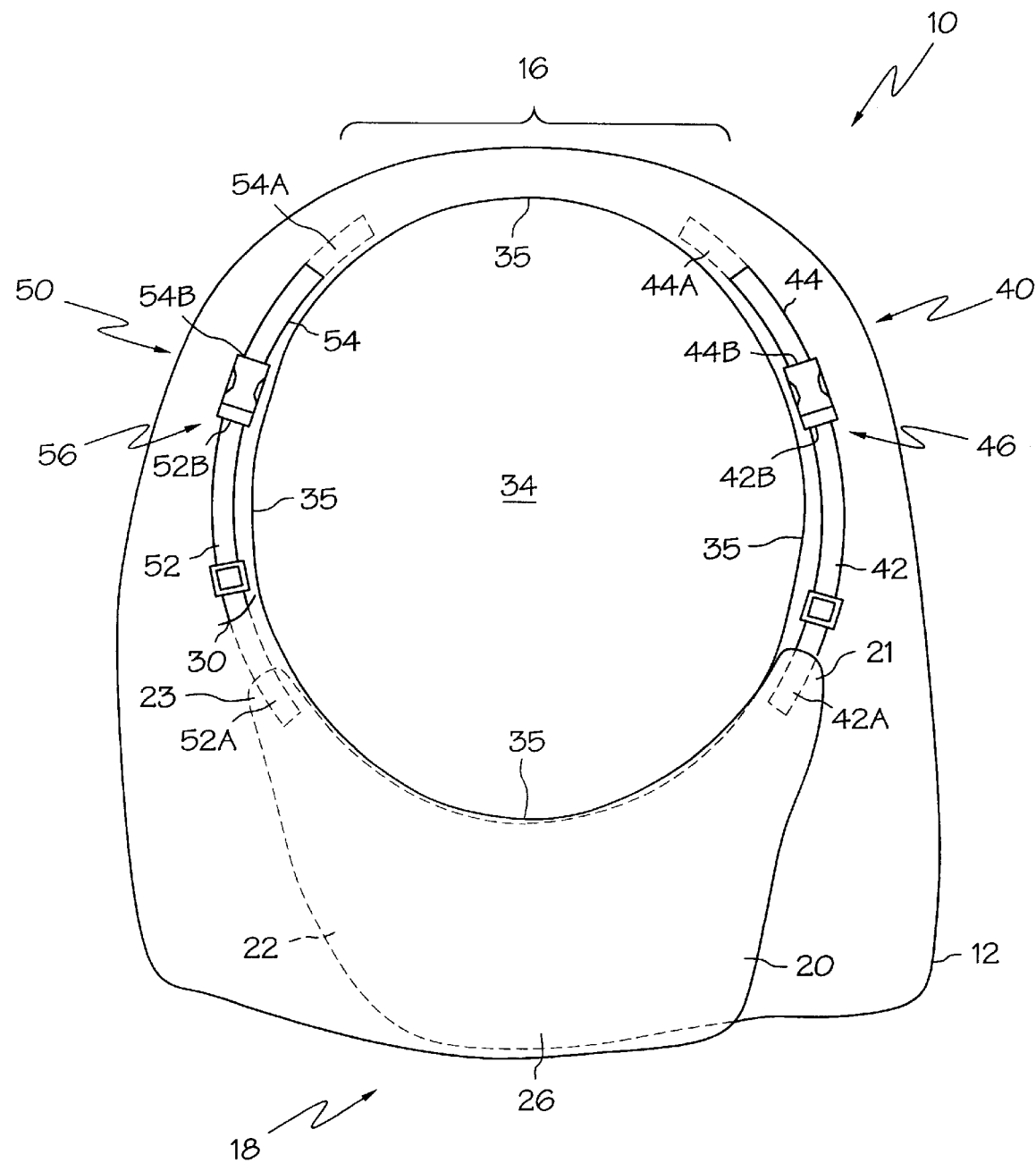
FIG. 4 is a front plan view of a horse blanket according to the present invention.

Referring to FIGS. 1–4, where like structure is identified with like reference numerals, a horse blanket 10 according to the present invention is described in detail. The horse blanket 10 comprises a body of blanket material 12 defining a major blanket portion 14, a wither/shoulder portion 16, and a front closure portion 18. The front closure portion 18 comprises first and second closure flaps 20, 22. As is clearly illustrated in FIG. 4, the first closure flap 20 includes a first closure flap end portion 21 and the second closure flap 22 includes a second closure flap end portion 23. A closure fastening assembly is coupled to the body of blanket material 12 and comprises a first releasable wither/shoulder attachment 40 and a second releasable wither/shoulder attachment 50. The first releasable wither/shoulder attachment 40 is coupled to the wither/shoulder portion 16 and the first closure flap 20. The second releasable wither/shoulder attachment 50 is coupled to the wither/shoulder portion 16 and the second closure flap 22.

A wither/shoulder attachment passage 30 is provided in the wither/shoulder portion 16 proximate the first closure flap 20 and extends from an interior side of the body of blanket material 12 to an exterior side of the body of blanket material 12. The passage 30 is positioned to pass a portion of the second releasable wither/shoulder attachment 50 there through.

To alleviate blanket binding and misalignment when a horse 32 moves its head up and down, at least one of the first releasable wither/shoulder attachment 40, the second releasable wither/shoulder attachment 50, the wither/shoulder portion 16, the first closure flap 20, and the second closure flap 22, is provided with an elastic portion oriented about a portion of a periphery of a neck opening 34 defined by the body of blanket material 12. As is clearly illustrated in FIG. 4; the periphery of the neck opening 34 is bounded by a neckline 35 of the blanket 10. The elastic portion permits the area of the neck opening 34 to expand as the horse 32 lowers its head in the manner indicated in FIG. 3. In the case of an average sized thoroughbred, the elastic portion is preferably designed to provide about 14" (35 cm) of neck opening expansion as a result of its longitudinal flexibility. Further, the strength of the elastic portion is selected to ensure a comfortably snug fit about the horse's neck. It is contemplated by the present invention that the amount of neck opening expansion necessarily provided by the elastic portion varies as a function of the size of the animal at issue and the extent to which the animal typically moves its head and neck.

According to one embodiment of the present invention, the elastic portion comprises first and second elastic straps 42, 52 provided in the first releasable wither/shoulder attachment 40 and the second releasable wither/shoulder attachment 50. The first releasable wither/shoulder attachment 40 comprises the first elastic strap 42, a first wither/shoulder securement 44, and a first releasable clip 46. The first elastic strap 42 has a first end 42A coupled to the first closure flap 20, and a second end 42B opposite the first end 42A of the first elastic strap 42. The first wither/shoulder securement 44 has a first end 44A coupled to the wither/shoulder portion 16 and a second end 44B opposite the first end 44A of the first securement 44. The first releasable clip 46 is coupled to the second end 42B of the first elastic strap 42 and the second end 44B of the first securement 44 and is operative to couple releasably the first elastic strap 42 and the first securement 44.

Similarly, the second releasable wither/shoulder attachment 50 comprises the second elastic strap 52, a second wither/shoulder securement 54, and a second releasable clip 56. The second elastic strap 52 has a first end 52A coupled to the second closure flap 22, and a second end 52B opposite the first end 52A of the second elastic strap 52. The second wither/shoulder securement 54 has a first end 54A coupled to the wither/shoulder portion 16 and a second end 54B opposite the first end 54A of the second securement 54. The second releasable clip 56 is coupled to the second end 52B of the second elastic strap 52 and the second end 54B of the second securement 54 and is operative to couple releasably the second elastic strap 52 and the second securement 54.

It is contemplated by the present invention that the hardware utilized in the first and second releasable wither/shoulder attachments 40, 50 of the present invention may incorporate adjustment and fitting components to enable proper dressing of the horse blanket 10 about the horse 32. It is further contemplated by the present invention that the first and second securements 44, 54 may be provided as part of a single length of strap extending across the wither/shoulder portion 16 of the horse blanket 10.

Alternatively, the elastic portion comprises a portion of stretch fabric, i.e., a fabric designed to contribute a predetermined amount of elasticity, to the horse blanket 10. The stretch fabric is positioned in any of a plurality of positions about the periphery of the neck opening 34. For example, the wither/shoulder portion 16, or the first and second closure flaps 20, 22, may be constructed of, in whole or in part, a stretch fabric portion.

The horse blanket 10 illustrated in FIGS. 1–4 defines a dressed configuration, i.e., the configuration of the horse blanket as it is positioned on and about the upper body of the horse 32. In the dressed configuration, the first closure flap 20 overlaps the second closure flap 22. In the case of a standard or average sized thoroughbred, the first closure flap 20 and the second closure flap 22 preferably define an overlap portion 26 of about 20" (51 cm) to about 30" 1(76 cm) extending across the front closure portion 18 of the dressed configuration. As is clearly illustrated in FIG. 4, the overlap portion 26 defines the extent of the first closure flap 20 and the second closure flap 22. The size of the overlap portion will vary depending upon the size of the animal to be fitted with the blanket 10. Further, a portion of the second releasable wither/shoulder attachment 50 passes through the passage 30.

Having described the invention in detail and by reference to preferred embodiments thereof, it will be apparent that modifications and variations are possible without departing from the scope of the invention defined in the appended claims. For example, it is contemplated that the blanket described herein may be utilized on other animals, e.g., llamas, sheep, donkeys, goats, cats, dogs, hogs, etc.

What is claimed is:

1. An animal blanket comprising:
    a body of blanket material defining a major blanket portion, a wither/shoulder portion, a neckline, and a front closure portion, said front closure portion comprising
        a first closure flap including a first closure flap end portion positioned along said neckline, and
        a second closure flap including a second closure flap end portion positioned along said neckline; and
    a closure fastening assembly coupled to said body of blanket material, said closure fastening assembly comprising
        a first releasable wither/shoulder attachment arranged to couple said first closure flap end portion to said wither/shoulder portion substantially along a portion of said neckline,
        a second releasable wither/shoulder attachment arranged to couple said second closure flap end portion to said wither/shoulder portion substantially along a portion of said neckline, and
        a wither/shoulder attachment passage extending from an interior side of said body of blanket material to an exterior side of said body of blanket material, said wither/shoulder attachment passage being positioned substantially along said neckline outside of said first closure flap and said second closure flap to pass a portion of said second releasable wither/shoulder attachment through said body of blanket material.

2. A blanket as claimed in claim 1 wherein at least one of said first releasable wither/shoulder attachment, said second releasable wither/shoulder attachment, said wither/shoulder portion, said first closure flap, and said second closure flap, is provided with an elastic portion oriented about a portion of a periphery of a neck opening defined by said body of blanket material.

3. A blanket as claimed in claim 2 wherein said elastic portion is designed to provide about 14" (35 cm) of neck opening expansion.

4. A blanket as claimed in claim 2 wherein said elastic portion is operative to permit the area of said neck opening to expand.

5. A blanket as claimed in claim 2 wherein said elastic portion comprises an elastic strap.

6. A blanket as claimed in claim 2 wherein said elastic portion comprises stretch fabric.

7. A blanket as claimed in claim 1 wherein said first releasable wither/shoulder attachment and said second releasable wither/shoulder attachment are provided with an elastic portion.

8. A blanket as claimed in claim 1 wherein said wither/shoulder portion is provided with an elastic portion.

9. A blanket as claimed in claim 1 wherein said first closure flap and said second closure flap are provided with an elastic portion.

10. A blanket as claimed in claim 1 wherein said wither/shoulder attachment passage is provided in said wither/shoulder portion.

11. A blanket as claimed in claim 1 wherein said wither/shoulder attachment passage is provided in said wither/shoulder portion proximate said first closure flap.

12. An animal blanket comprising:
    a body of blanket material defining a major blanket portion, a wither/shoulder portion, a neckline, and a front closure portion, said front closure portion comprising
        a first closure flat) including a first closure flap end portion positioned along said neckline, and
        a second closure flap including a second closure flap end portion positioned along said neckline; and
    a first releasable wither/shoulder attachment arranged to couple said first closure flap end portion to said wither/shoulder portion along a portion of said neckline, said first releasable wither/shoulder attachment comprising
        a first elastic strap having a first end coupled to said first closure flap end portion and a second end opposite said first end of said first elastic strap,
        a first wither/shoulder securement having a first end coupled to said wither/shoulder portion and a second end opposite said first end of said first securement, and
        a first releasable clip coupled to said second end of said first elastic strap and said second end of said first securement, wherein said first releasable clip is operative to couple releasably said first elastic strap and said first securement;
    a second releasable wither/shoulder attachment arranged to couple said second closure flap end portion to said wither/shoulder portion along said neckline, said second releasable wither/shoulder attachment comprising
        a second elastic strap having a first end coupled to said second closure flap end portion and a second end opposite said first end of said second elastic strap,
        a second wither/shoulder securement having a first end coupled to said wither/shoulder portion and a second end opposite said first end of said second securement, and
        a second releasable clip coupled to said second end of said second elastic strap and said second end of said second securement, wherein said second releasable clip is operative to couple releasably said second elastic strap and said second securement; and
    a wither/shoulder attachment passage extending from an interior side of said body of blanket material to an exterior side of said body of blanket material, said wither/shoulder attachment passage being positioned substantially along said neckline outside of said first closure flap and said second closure flap to pass a portion of said second releasable wither/shoulder attachment through said body of blanket material.

13. An animal blanket defining a dressed configuration, said dressed configuration comprising:
    a body of blanket material defining a major blanket portion, a wither/shoulder portion, a neckline, and a front closure portion, said front closure portion comprising a first closure flap including a first closure flap end portion positioned along said neckline, and a second closure flap including a second closure flap end portion positioned along said neckline, wherein said first closure flap overlaps said second closure flap and wherein said first closure flap, said second closure flap, and said wither/shoulder portion define a neck opening; and a closure fastening assembly coupled to said body of blanket material, said closure fastening assembly comprising a first releasable wither/shoulder attachment arranged to couple said first closure flap end portion to said wither/shoulder portion substantially along a portion of said neckline, a second releasable wither/shoulder attachment arranged to couple said second closure flap end portion to said wither/shoulder portion substantially along a portion of said neckline, and a wither/shoulder attachment passage extending from an interior side of said body of blanket material to an exterior side of said body of blanket material, said wither/shoulder attachment passage being positioned substantially along said neckline outside of said first closure flap and said second closure flap, wherein a portion of said second releasable wither/shoulder attachment passes through said passage.

14. A blanket as claimed in claim 13 wherein at least one of said first releasable wither/shoulder attachment, said second releasable wither/shoulder attachment, said wither/shoulder portion, said first closure flap, and said second closure flap, is provided with an elastic portion oriented about a portion of a periphery of said neck opening.

15. A blanket as claimed in claim 14 wherein said elastic portion is operative to permit the area of said neck opening to expand.

16. A blanket as claimed in claim 13 wherein said first releasable wither/shoulder attachment and said second releasable wither/shoulder attachment are provided with an elastic portion.

17. A blanket as claimed in claim 13 wherein said wither/shoulder portion is provided with an elastic portion.

18. A blanket as claimed in claim 13 wherein said first closure flap and said second closure flap are provided with an elastic portion.

* * * * *